(No Model.)
J. MORGAN.
CULTIVATOR.
No. 333,535. Patented Jan. 5, 1886.
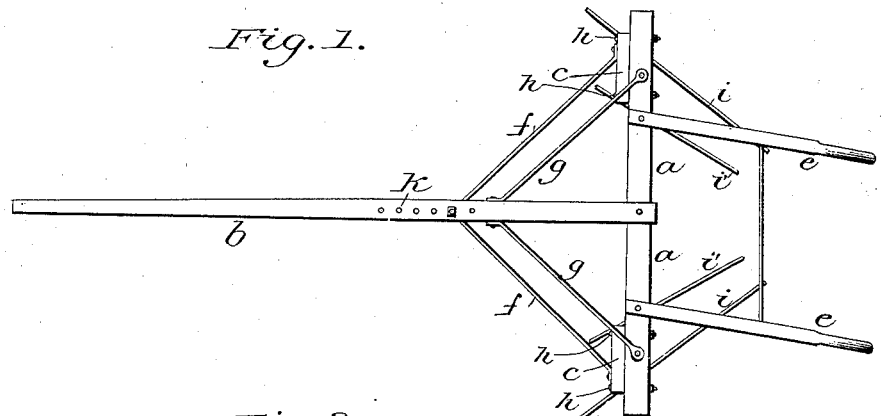
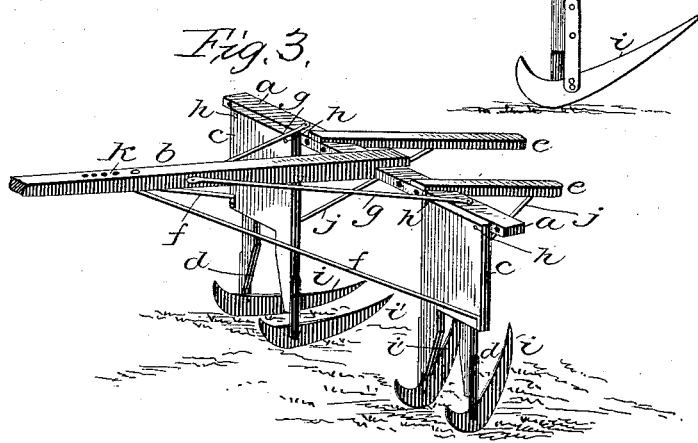
Witnesses: Inventor:

UNITED STATES PATENT OFFICE.

JOSEPH MORGAN, OF WEST SPRINGFIELD, MASSACHUSETTS.

CULTIVATOR.

SPECIFICATION forming part of Letters Patent No. 333,535, dated January 5, 1886.

Application filed May 11, 1885. Serial No. 165,158. (No model.)

*To all whom it may concern:*

Be it known that I, JOSEPH MORGAN, of West Springfield, county of Hampden, and State of Massachusetts, have invented a new and useful Improvement in Cultivators; and I do declare that the following is a full, clear, and exact description of the same, reference being had to the annexed drawings, in which—

Figure 1 represents a plan of my invention; Fig. 2, a side elevation. Fig. 3 illustrates in detail the sectional contracting-standards.

My invention relates to cultivators used to cut weeds, loosen and gather soil about plants.

My improvement consists in simplicity and cheapness of construction, whereby it can readily be adjusted and still be light and easily handled, and also in the formation of hoes to secure the destruction of weeds and a pulverized soil, the narrow rear ends of the hoes cutting close to the plants, two on each side, as it passes along the row.

In the drawings, Fig. 1, $a$ represents the perforated bar; $b$, the pole, perforated at $k$, having the rear end attached to the center of bar $a$; $g$ $g$, brace-rods holding pole in position; $o$, a double-tree pivoted to pole; $e$ $e$, guide-handles projecting from bar $a$ at an angle to enable the operator to follow between the rows, and $j$ $j$ brace-rods or standards.

$c$ $c$, Fig. 2, are contracting-standards formed in two sections, having shoulders cut at their upper ends, upon which rests the bar $a$, one attached to each end and capable of longitudinal adjustment on the same by bolts $h$ $h$. The main standards are perforated, as shown at $g$ $g$, and secured against splitting by bolt $s$, with nut and washers. The lower half of said standards are cut away from the outside to the width of three inches and beveled to one inch at the lower end, to which the hoe-stocks are secured by bolts. The sections $d$, of same height, to which is attached the outside hoe, as seen in Fig. 3, overlap and slide in main standards, to which they are attached by bolts at $g$ to the outside holes, if the rows are wide apart, or the center holes if near together. By this construction we are enabled to work between rows of half the ordinary width without injury to the plants.

The anti-clogging hoes $i$ $i$ are formed of sheet-steel of the required thickness and cut to pattern, with upper and under edges straight, and tapering to a third of their width in the rear, and curved up in front, extending to an elevated point, three inches or more toward off obstructions. The lower edge of said hoes are beveled for cutting and the front end curved diagonally to give cutting and turning power to the hoes. The hoe-stocks $l$ $l$ are iron plates flanged at their upper ends to receive the standards, and having broad flat lower ends riveted to the hoes. These ends are set diagonal to both the horizontal and vertical line of the upper ends, causing rear ends of hoes to point in, two on a side, and also setting the cutting-edge under to cut and cover the weeds and turn up the fresh soil, while the narrow rear ends of said hoes throw a portion about the plant. The brace-rods $f$ $f$, adjusted on pole $b$ by bolt $k$, raise and lower the rear ends of hoes. I am enabled by this simple construction to throw more or less soil about the plants, as desired.

I am aware that somewhat similar cultivators have been used, but expensive, heavy, cumbersome; neither do they accomplish the above-mentioned result.

What I claim as new, and desire to secure by Letters Patent, is—

1. The improved anti-clogging hoes $i$ $i$, of uniform thickness, with straight upper and under edges tapering narrow in the rear and curved up in front to an elevated point, having front also curved diagonally, substantially as and for the purposes set forth.

2. In combination with pole $b$ and cross-bar $a$, the standards $c$, having the broad upper section provided with two series of holes, and the outer standard, $d$, adjustable vertically and toward and from the inner hoe by means of the said series of holes, substantially as shown and described.

3. The combination, with the frame $a$ $b$ and standards $c$ $d$, of the flanged hoe-stocks having the attaching-plates arranged diagonally to the standards and frame, substantially as shown and described.

JOSEPH MORGAN.

Witnesses:
GEORGE L. HERSEY,
JAMES ANDERSON.